Patented Jan. 14, 1947

2,414,118

UNITED STATES PATENT OFFICE 2,414,118

SYNTHESIS OF FLUORENE AND ITS DERIVATIVES

Milton Orchin, Pittsburgh, Pa., assignor to the United States of America, as represented by the Secretary of the Interior No Drawing. Application March 27, 1945, Serial No. 585,177

4 Claims. (Cl. 260—668)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to fluorene and its derivatives, and to a catalytic process for their preparation. More particularly, this invention relates to the catalytic cyclodehydrogenation of certain alkylated biphenyls to fluorene and its nuclear substitution products. By the expression "nuclear substitution products" it is intended to include fluorene compounds having a fluorene nucleus and having one or more nuclear hydrogen atoms replaced by other atoms or radicals as hereinafter to be more fully explained.

Accordingly, this invention has for an object the production of fluorene and its nuclear substitution products as well as the provision of a catalytic process for carrying out the foregoing. Another object is the preparation of new chemical compounds.

The foregoing and other related objects are accomplished in accordance with this invention wherein fluorene and its nuclear substitution products are prepared by the cyclodehydrogenation of a compound from the group of ortho-methylbiphenyl and its nuclear substitution products having a nuclear hydrogen atom in the or-tho' position. It has been found that the cyclodehydrogenation of 2-methylbiphenyl, 2,2'-dimethylbiphenyl and their nuclear substitution products having a nuclear hydrogen atom in the ortho' position can be carried out in simple fashion by passing such a compound in the vapor phase at a temperature of at least 300 degrees centigrade over a dehydrogenation catalyst, preferably palladium-charcoal although other suitable dehydrogenation catalysts can be employed such as for example chromium oxide, platinum black, Raney nickel and the like either in massive form or suitably supported on asbestos, kieselguhr and the like.

It has been found for example that 4-methyl fluorene can be prepared from 2,2'dimethylbiphenyl in accordance with this invention, and similarly, fluorene from 2-methylbiphenyl or 2-methyl-1', 2', 3', 4'-tetrahydrobiphenyl. Other nuclear substituted 2-methylbiphenyls which may be employed to prepare corresponding fluorene compounds in accordance with this invention by cyclodehydrogenation include 2-methylbiphenyls having methyl or other alkyl aliphatic substituent on any of the nuclear carbon atoms excepting an ortho' position, as previously explained, as well as the halogenated or nitrated derivatives of ortho-methylbiphenyls having a nuclear hydrogen atom in the ortho' position.

The catalytic cyclodehydrogenation of a suitable 2-methylbiphenyl compound is preferably carried out in the vapor phase in this invention, and generally at a temperature sufficient to maintain the chosen 2-methylbiphenyl compound vaporized but below the temperature at which substantial thermal cracking takes place. A suitable temperature range for carrying out the reaction is a temperature between 400 degrees centigrade and 500 degrees centigrade such as for example a temperature of the order of 450 degrees centigrade.

The vaporized reactant may be passed over the catalyst at ordinary atmospheric pressure, super-atmospheric pressure or sub-atmospheric pressure, but generally it is preferred to carry out the catalytic cyclodehydrogenation at ordinary atmospheric pressure in the presence of a slow stream of an inert carrier gas. For example, a slow stream of hydrogen may concurrently be passed through the reaction apparatus together with the vaporized 2-methylbiphenyl compound. Other suitable inert carrier gases include nitrogen, helium and argon, but hydrogen is preferred.

While a suitable dehydrogenation catalyst may be employed in massive form, it is preferred to employ it supported upon a suitable carrier material which permits free passage of gases and vapors while providing a suitable intimate contact between the vaporized reactant and the supported catalyst. For example, a preferred palladium-charcoal catalyst was prepared by mixing 12 grams of charcoal with 8 grams of palladium chloride and 24 cubic centimeters of 40% formaldehyde, cooling the mixture with stirring, and then stirring 48 cubic centimeters of 50% potassium hydroxide solution into the thus prepared mixture by drop-wise addition. The thus prepared mixture was filtered away from the supernatant liquid, washed with water until free of alkalis and dried. Thereupon, 30 parts by weight of the dried palladium-charcoal mixture thus prepared was mixed with 70 parts by weight of asbestos and the resulting supported palladium-charcoal catalyst was employed for the dehydrogenation in accordance with this invention.

The following illustrative examples show how the invention may be carried out, but it is not limited thereto. Parts and percentage compositions are by weight unless otherwise designated, and the indicated temperatures are on the centigrade scale.

Example 1

An iron pipe about 70 centimeters in length and 15 millimeters inside diameter was wrapped with asbestos and then with 24 feet of No. 22 nichrome electrical resistance wire to serve as a heating element. The wire windings were covered with a second layer of asbestos and the wrapped pipe placed inside a cylindrical length of heat-resisting glass tubing. A suitable source of electrical current was then connected to the nichrome winding and controlled through a switch and rheostat. An inner tube having an outside diameter of 14 millimeters and made of "Pyrex" glass was then inserted to form an inner lining for the iron pipe and the entire apparatus was mounted on a suitable support so that its long dimension was about 20 degrees from the horizontal. The lower portion of the inner glass tube was connected to a suitable receiver provided with means for excluding atmospheric air and the upper end of the tube was connected to a suitable device for feeding liquid reactant and hydrogen gas to the catalyst tube. Thereupon, the tube was charged with palladium-charcoal catalyst supported on asbestos prepared as above described, a slow stream of hydrogen was admitted and suitable means for measuring the internal temperature of the catalyst tube was connected. By means of the electrical heating element and rheostat the temperature inside the catalyst tube was adjusted to 450 degrees centigrade, and then 12 grams of 2,2'-dimethylbiphenyl was passed over the catalyst bed in the vapor phase together with an excess of hydrogen gas to act as a diluent carrier. The 2,2'-dimethylbiphenyl is admitted to the catalyst tube at the rate of about 5 to 8 cubic centimeters per hour. After all the reacted material was condensed and collected in the receiver, it was again passed over the catalyst for a total of 5 successive cycles, thus giving the effect of a catalyst tube having 5 times the length of the tube employed. 10.5 grams of liquid product ($n^{25}$D 1.5968) was separated by dilution with petroleum ether in excess and selective adsorption of the converted constituent thereof on Activated Alumina. The absorbed product exhibited fluorescence under ultra-violet light. 6.5 grams of material was unconverted. The fluorescent fraction, upon extraction with excess in benzene and evaporation to dryness, gave 100 mg. of a colored high molecular weight material which was not further investigated and 2.75 grams of crystalline 4-methyl fluorene which had a melting point of 70.4–71.2 degrees centigrade after repeated crystallization from methanol. This 4-methyl fluorene has properties substantially differing from those reported in the literature, as indicated by the above-indicated melting point. Also, the ultra-violet absorption of this 4-methyl fluorene showed maxima at 2660 A., log E 4.31 and 2960 A., log E 3.60 and minima at 2340 A., log E 3.40 and 2940 A., log E 3.53.

A similar yield was obtained when the catalyst employed was prepared by shaking 5 grams of 30% palladium-charcoal with 9 grams of ignited asbestos and adding glass helices to this mixture.

Example 2

Employing the method, apparatus and catalyst of Example, 1, 9.8 grams of 2-methylbiphenyl was passed once over the supported palladium-charcoal catalyst at 450 degrees centigrade. The mixture of oil and solid-collecting in the receiver was taken up in alcohol, cooled and the precipitated solid filtered from the liquid. 2.8 grams of solid material having a melting point of 104–110 degrees centigrade was obtained. Upon recrystallization from alcohol, pure fluorene was obtained having a melting point of 115.0–115.8 degrees centigrade. By passing the original mother liquor through a bed of Activated Alumina to selectively adsorb the colored material, and thereafter extracting the bed with an excess of alcohol, 0.54 gram of additional fluorene was obtained by evaporation of the alcoholic extract. In a further test, 9.0 grams of 1',2',3',4'-tetrahydro-2-methlylbiphenyl were passed in a single pass over the supported palladium-charcoal catalyst described in Example 1, and 2.06 grams of pure fluorene were obtained. There was no diminution in catalyst activity with successive batches of raw material, and therefore it is apparent that the catalyst has an extremely long life. Byproducts are very small in quantity and by successively recycling unconverted 2-methylbiphenyl, yields approaching quantitative proportions can be obtained.

While the produced fluorene and its derivatives in the foregoing examples and description can be chromatographically separated from unconverted raw material by passing the crude product directly over a suitable absorbent material, for example, Activated Alumina or a mixture of Activated Alumina with "Supercell" or other adsorbent earth, it has been found that diluting the mixture with a quantity of petroleum ether or other light hydrocarbon distillate before adsorption provides a more rapid through-put of product. After selective adsorption, the adsorbed highly colored product may be removed by any desired means, preferably by extraction with hot alcohol or other volatile solvent for fluorene compounds.

Various changes can be made in the invention as illustrated and described without departing from the spirit and scope thereof, since many varying and widely differing embodiments of the invention will occur to one skilled in the art.

What I claim is:

1. A process for the production of fluorene and its nuclear substitution products which comprises passing a compound from the group of ortho-methylbiphenyl and its nuclear substitution products having a nuclearhydrogen atom in the ortho' position, in the vapor phase at a temperature of at least 300 degrees centigrade over a dehydrogenation catalyst.

2. A process for the production of fluorene and its nuclear substitution products which comprises passing a compound from the group of 2-methylbiphenyl and its nuclear substitution products having a nuclearhydrogen atom in the 2' position in the vapor phase at a temperature between 400 degrees and 500 degrees centigrade over a dehydrogenation catalyst comprising palladium-charcoal.

3. A process which comprises passing vaporized 2,2'-dimethylbiphenyl at a temperature of about 450 degrees centigrade over an asbestos-supported palladium-charcoal catalyst, adsorbing the formed 4-methylfluorene on Activated Alumina, extracting the absorbate with a suitable solvent, and recovering 4-methylfluorene by evaporative crystallization.

4. As a new compound, 4-methylfluorene having a melting point of 71.5–72.5 degrees centigrade, and an ultra-violet absorption spectra showing maxima at 2660 A. log E 4.31 and 2960 A. log E 3.60 and minima at 2340 A. log E 3.40 and 2940 A. log E 3.53.

MILTON ORCHIN.